United States Patent
Keisala

(10) Patent No.: US 6,714,609 B1
(45) Date of Patent: Mar. 30, 2004

(54) CO-CHANNEL INTERFERENCE IN A RECEIVER

(75) Inventor: Jyrki Keisala, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/623,017

(22) PCT Filed: Dec. 28, 1999

(86) PCT No.: PCT/FI99/01085

§ 371 (c)(1), (2), (4) Date: Aug. 25, 2000

(87) PCT Pub. No.: WO00/41317

PCT Pub. Date: Jul. 13, 2000

(30) Foreign Application Priority Data

Dec. 31, 1998 (FI) .................................................. 982857

(51) Int. Cl.[7] .............................................. H04B 1/10
(52) U.S. Cl. ........................ 375/349; 375/343; 375/346
(58) Field of Search ................................ 375/340, 341, 375/343, 346, 347, 349, 148, 150, 152, 231, 267, 285; 455/296, 132, 133, 501

(56) References Cited

U.S. PATENT DOCUMENTS

| | | | | |
|---|---|---|---|---|
| 5,701,333 A | * | 12/1997 | Okanoue et al. | 375/347 |
| 5,710,792 A | * | 1/1998 | Fukawa et al. | 375/229 |
| 5,710,797 A | * | 1/1998 | Segal et al. | 375/346 |
| 5,933,768 A | * | 8/1999 | Skold et al. | 455/296 |
| 6,249,518 B1 | * | 6/2001 | Cui | 370/347 |
| 6,304,618 B1 | * | 10/2001 | Hafeez et al. | 375/341 |
| 6,418,175 B1 | * | 7/2002 | Pukkila et al. | 375/347 |
| 6,519,477 B1 | * | 2/2003 | Baier et al. | 455/67.11 |

FOREIGN PATENT DOCUMENTS

| | | |
|---|---|---|
| EP | 637 139 | 2/1995 |
| EP | 637 683 | 8/1995 |
| EP | 667 683 | 8/1995 |
| EP | 0 667 683 A2 | 8/1995 |
| FI | 962736 A | 1/1998 |
| FI | 972688 A | 12/1998 |
| WO | WO 96/11533 | 4/1996 |
| WO | WO 98/01959 | 1/1998 |
| WO | WO 98/38750 | 9/1998 |

OTHER PUBLICATIONS

Pekka A. Ranta, Ari Hottinen and Zhi-Chun Honkasalo, "Co-channel Interference Cancelling Receiver for TDMA Mobile System," Nokia Research Center (0-7803-2486-2/95), p. 17-21, (1995).

* cited by examiner

Primary Examiner—Phoung Phu
(74) Attorney, Agent, or Firm—Pillsbury Winthrop LLP

(57) ABSTRACT

The invention relates to a reception method and a receiver for a TDMA radio system, in which received signals include a desired signal and one or more interference signals, which desired signal and interference signal include a predetermined sequence, by which the signals can be separated from each other. The receiver searches for the most interfering interference signal and forms a signal estimate of the desired signal using the predetermined sequence of the desired signal. The receiver then forms the first residual signal, which describes the difference between the signal estimates of the received signal and the desired signal; the receiver then forms the second residual signal, which describes the difference between the received signal and the co-channel signal estimate. The receiver compares the first residual signal with the second residual signal and based on the comparison, selects either single detection or joint detection to detect the received signal.

16 Claims, 2 Drawing Sheets

CO-CHANNEL INTERFERENCE IN A RECEIVER

This application is the national phase of international application PCT/FI99/01085 filed Dec. 28, 1999 which designated the U.S.

FIELD OF THE INVENTION

The field of the invention is a reception and detection solution in a radio system. More particularly the invention relates to the observation of co-channel interferences in a receiver.

BACKGROUND OF THE INVENTION

In a cellular radio system, the quality of the connection between a base transceiver station and a subscriber terminal varies all the time. This variation is caused by radio waves that are fading as a function of distance and time in a fading channel and by interfering factors on the radio path, such as other signals on the same channel. In the cellular radio system, the same frequency must be continually used in different cells because of the limited scope of the frequency range. Co-channel signals usually coming from various transmitters arrive at a receiver operating at a certain frequency, which co-channel signals have propagated along various paths and which are thus multipath signals. The performance of a receiver can be improved by using joint detection of the most strongest interferences.

If co-channel detection is used in a situation or environment, in which co-channel interference does not occur, but the interference is mainly noise, the performance of a receiver weakens. This is due to the fact that the receiver uses estimated channel taps of the co-channel without co-channel interference, which increases noise e.g. in the transition metrics of the trellis in a Viterbi detector, and the probability of a bit error of the detector increases. As the environment and situation of a mobile terminal in particular change all the time, the terminal is sometimes in a situation with co-channel interference, whereas at other times the greatest interference is noise.

BRIEF DESCRIPTION OF THE INVENTION

The object of the invention is thus to provide a method and a receiver implementing the method in such a manner that the above problems can be solved. The invention relates to a reception method used in a radio system, in which a receiver receives signals comprising a desired signal and one or more interference signals, which desired signal and interference signals comprise a predetermined sequence, by which the signals can be separated from each other. Further in the inventive method, a signal estimate of the desired signal is formed by means of the predetermined sequence of the desired signal; the most interfering interference signal is searched and a co-channel signal estimate is formed by means of the predetermined sequences of the desired signal and the interference signal; the first residual signal is formed, which describes the difference between the received signal and the signal estimate of the desired signal; the second residual signal is formed, which describes the difference between the received signal and co-channel signal estimate; the first residual signal is compared with the second residual signal and on the basis of the comparison, the received signal is detected either by one signal detection, whereby the effect of the interference signal on the desired signal is left unnoticed, or by joint detection, whereby the effect of the interference signal on the detection of the desired signal is taken into account.

The invention also relates to a receiver for a radio system, in which signals to be received comprise a desired signal and one or more at least occasionally occurring interference signals, which desired signal and interference signal comprise a predetermined sequence, by which the signals can be separated from each other. The receiver of the invention is characterized in that the receiver comprises: means for searching for the most interfering interference signal; means for forming a signal estimate of the desired signal by means of the predetermined sequence of the desired signal; means for forming a co-channel signal estimate by means of the predetermined sequences of the desired signal and interference signal; means for forming the first residual signal, which describes the difference between the received signal and the signal estimate of the desired signal; means for forming the second residual signal, which describes the difference between the received signal and co-channel signal estimate; means for comparing the first residual signal with the second residual signal and for selecting for a detector on the basis of the comparison either a one signal detection or joint detection to detect the received signal.

The preferred embodiments of the invention are disclosed in the dependent claims.

The method and system of the invention provide a plurality of advantages. The detection of a received signal improves, as the detection is suitably optimised both in the situations in which co-channel interferences occur or do not occur.

BRIEF DESCRIPTION OF THE DRAWINGS

In the following the invention will be described in greater detail in connection with the preferred embodiments with reference to the attached drawings, in which.

DETAILED DESCRIPTION OF THE INVENTION

The solution of the invention can especially be applied to DCS and GSM systems without, however, so restricted. The inventive solution is applicable for use in a base transceiver station and/or mobile phone.

Figure 1:
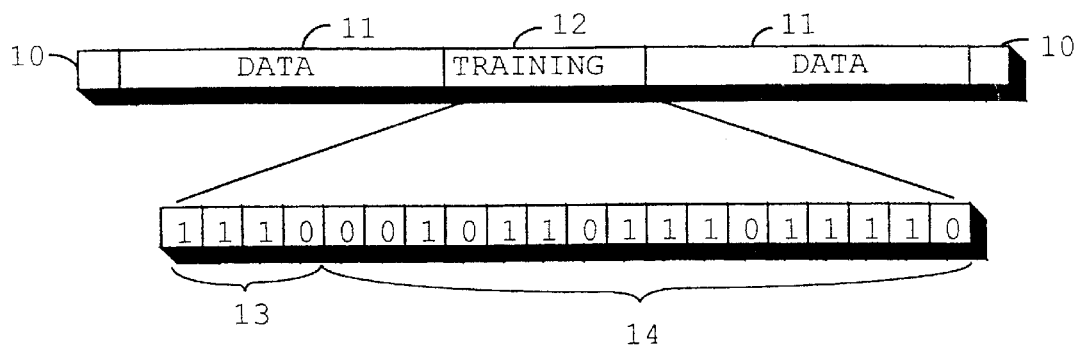
FIG. 1 shows a normal burst of the GSM radio system.

Let us now take a closer look on the solution of the invention when it is applied to the GSM system. A normal burst of the GSM system is shown in FIG. 1. The normal burst usually comprises about 150 symbols altogether. A symbol represents a bit or a combination of bits. Symbols of the bursts are in sequences which comprise start symbols and end symbols, i.e. edge symbols, 10, data symbol sequences 11 grouped into two parts, training symbols 12. Let us assume that symbols are bits, as usual. A training sequence can thus be illustrated as in FIG. 1, in which there are at the beginning of the training sequence three four guard bits 13, which are the same as the four bits at the end of the training sequence. In addition to the guard bits of a training sequence, there are typically 16 reference bits 14 in a training sequence.

Figure 2:
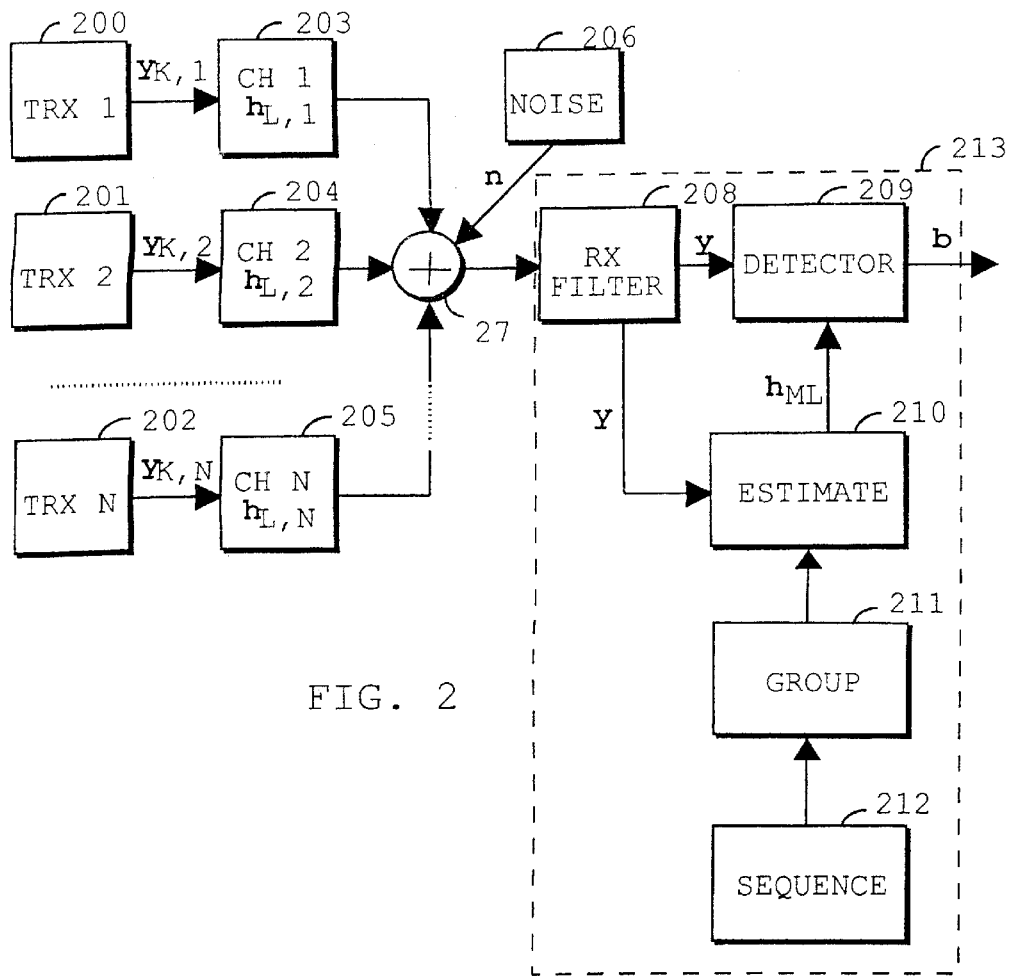
FIG. 2 shows a block diagram of a receiver using joint detection.

A prior art system model in which co-channel interferences occur is shown in FIG. 2. The system model comprises transmitters 200 to 202, channels 203 to 205, a noise source 206, a summer 207 connecting the channels and the noise, a receiver filter 208, a detector 209, channel estimation means 210, grouping means 211, sequence means 212. A receiver 213 comprises blocks 208 to 212. The transmitters 200 to 202, the number of which is Q and which are base transceiver stations of the radio system, for example, transmit their own signal $Y_{K,i}$ in the channel $Ch_i$ 203 to 205, whose impulse response is described by $h_j$. Noise n is summed to the signals $Y_{K,i}$ in the summer 207. The receiver 213, which may for example be a subscriber terminal, i.e. usually a mobile phone, of the radio system, receives a multipath signal by means of the receiver filter 208 typically comprising an antenna and a radio frequency filter. After the filtering, the signal y propagates both to the detection 209 and to the channel estimator 210, which makes the co-channel estimation using subsets of the predetermined sequence that have come from the grouping means 211 and the received signal y. The grouping means 211 form the subsets of the predetermined sequences of the information that has come from the sequence means 212. The detected signal propagates from the detecting means 209, e.g. a prior art Viterbi detection, to the other parts of the receiver (not shown in the figure). Interference suppression is performed in the detecting means 209, for example. This solution is described in greater detail in Finnish Patent 962736, which is taken herein as a reference.

In the inventive solution, a predetermined sequence, which is preferably characteristic of each transmitter, is transmitted along with the signal to a receiver, which may be a base transceiver station or a mobile phone. Correspondingly, a base transceiver station or mobile phone can operate as a transmitter. The received signal comprises a desired signal, i.e. a signal that is needed to be detected, and an interference signal, e.g. other signals and noise in the same radio system. A training sequence of a normal burst operates preferably as a predetermined sequence in the GSM system, for example. This training sequence is used for arranging the received interference signals according to interference. Interference may be due to the strength of the signal or poor cross-correlation qualities of the training sequences. Correlation C is calculated digitally as a cross product for known sequences X and Y in the following manner:

$$(1)\ C(n) = \sum_{i=1}^{N} x(i)y(n+i),$$

where C(n) corresponds to an element according to the index n in the vector C, x(i) is an element according to the index (i), i.e. a sample in the sequence X, and y(n+i) is an element according to the index n+i, i.e. a sample in the sequence Y. If training sequences of the desired signal and the interference signal are similar, the correlation C with the index n=0 obtains a high value, which means a poor cross-correlation quality. The value n=0 of the index means that the training sequences have no temporal nor elemental transition in respect of each other.

To determine signal strengths multipath channels are first estimated. There are various known search methods of interference signals that can be applied in the solution of the invention. Co-channel estimation is carried out by using a maximum likelihood method (ML method), for instance, which is the most usual estimating method and easy to apply. Most preferably, the most interfering interference signal is searched for each burst separately. A co-channel estimate ĥ for the joint detection in particular is obtained from the formula:

$$\hat{h}=(M^H V^{-1} M)^{-1} M^H V^{-1} y, \qquad (2)$$

where the matrix M is $M=[M_1, M_2, \ldots M_N]$, V is the noise covariance and y is the received multipath propagated signal. In a digital radio system, y is formed of digital samples which have been taken from the received signal. $M^H$ is a Hermitian matrix of the matrix M and $V^{-1}$ refers to the inverse matrix of the matrix V. The noise covariance V refers to the effective value of noise. The noise covariance V can in turn be formed for example of two random variables $n_1$ and $n_2$ in the following manner:

$$V_{n_1,n_2}=cov\{n_1,n_2\}=E\{(n_1-m_1)(n_2-m_2)^T\} \qquad (3)$$

where the operator E represents the formation of an expected value, $m_1$ is the expected value of the variable $n_1$ and $m_2$ is the expected value of the variable $n_2$. Assuming that noise is white, the equation (2) can also be written in the form $$\hat{h}=(M^H M)^{-1} M^H y \qquad (4)$$

The matrix $M_n$ is formed of predetermined sequences. It is assumed that the matrix M includes N co-channel signals and that a predetermined sequence includes P+L symbols, where L is the length of a channel memory and P is the amount of reference bits.

The received signal y, which corresponds to each predetermined sequence, has the formula:

$$y=Mh+n, \qquad (5)$$

where n represents Gaussian noise and h is the impulse response of the channel. Let us now take a closer look on the formation of a special correlation matrix M needed in the co-channel estimation. The amount N of co-channel signals is preferably two, whereby the most interfering signal is searched in pairs such that one signal is the desired signal and the other signal is the interference signal. Let the channel estimation be made for two signals, for example, and 5 impulse response taps be estimated for both channels. The 5 taps of the channel estimator represent the 5 most important delays in the impulse response of the channel. As a predetermined sequence, e.g. the following training sequence of the GSM system (the reference length 16 bits) is used:

training sequence 1: 0 0 1 0 0 1 0 1 1 1 0 0 0 0 1 0 training sequence 2: 0 0 1 0 1 1 0 1 1 1 0 1 1 1 1 0

Now, P=16 and L=5−1=4 (repetition bits are required one less than what is the estimated amount of channel taps). 4 bits at the end of the training sequence are repeated at the beginning of the sequence, whereby the sequence are in their entirety:

sequence 1: 0 0 1 0 0 0 1 0 0 1 0 1 1 1 0 0 0 0 1 0 sequence 2: 1 1 1 0 0 0 1 0 1 1 0 1 1 1 0 1 1 1 1 0

The co-channel estimation matrix M is now as follows:

The co-channel estimation matrix $M$ is now as follows:

$$M = \begin{bmatrix} 0 & 0 & 1 & 0 & 0 & 0 & 0 & 1 & 1 & 1 \\ 0 & 0 & 0 & 1 & 0 & 0 & 0 & 0 & 1 & 1 \\ 1 & 0 & 0 & 0 & 1 & 1 & 0 & 0 & 0 & 1 \\ 0 & 1 & 0 & 0 & 0 & 0 & 1 & 0 & 0 & 0 \\ 0 & 0 & 1 & 0 & 0 & 1 & 0 & 1 & 0 & 0 \\ 1 & 0 & 0 & 1 & 0 & 1 & 1 & 0 & 1 & 0 \\ 0 & 1 & 0 & 0 & 1 & 0 & 1 & 1 & 0 & 1 \\ 1 & 0 & 1 & 0 & 0 & 1 & 0 & 1 & 1 & 0 \\ 1 & 1 & 0 & 1 & 0 & 1 & 1 & 0 & 1 & 1 \\ 1 & 1 & 1 & 0 & 1 & 1 & 1 & 1 & 0 & 1 \\ 0 & 1 & 1 & 1 & 0 & 0 & 1 & 1 & 1 & 0 \\ 0 & 0 & 1 & 1 & 1 & 1 & 0 & 1 & 1 & 1 \\ 0 & 0 & 0 & 1 & 1 & 1 & 1 & 0 & 1 & 1 \\ 0 & 0 & 0 & 0 & 1 & 1 & 1 & 1 & 0 & 1 \\ 1 & 0 & 0 & 0 & 0 & 1 & 1 & 1 & 1 & 0 \\ 0 & 1 & 0 & 0 & 0 & 0 & 1 & 1 & 1 & 1 \end{bmatrix}$$

The channel estimation matrix of one channel, too, is formed in a similar manner, but only the predetermined sequence of the desired signal is utilized thereby. To find the strongest interference signal, the predetermined sequences are grouped into subsets, and the channel estimation is carried out in subsets. By means of the formed channel estimates, an estimate signal is formed, which is compared with the received signal, and on the basis of the comparison a subset with the greatest signal strength is found. This solution is described in greater detail in Finnish Patent 962736, which is taken herein as a reference.

Another simple way to search for the strongest interference signal is to form the energy of the channel estimates for example in the following manner:

$$(6) \quad P_i = \sum_{k=0}^{L} \hat{h}_{k,i}^2.$$

A third possibility is to use an adapted filter, which carries out the channel estimation for all the received signals simultaneously for example in the following way:

$$(7) \quad \hat{h}_{MF} = \frac{1}{P} M^H y.$$

The strongest interference signal can be found for example by using the formula (5).

Let us now take a closer look on the solution according to the invention. Let us mark the terms and results relating to the desired signal with the index 1 and the terms and results relating to the interference signal with the index 2. The channel estimator forms the estimates describing the channel estimate, the estimates relating both to the desired signal and to the assumed interference signal. The channel estimate of the desired signal has the formula: $\hat{h}_1 = (h_0^1, h_1^1 \ldots h_L^1)^T$, where L refers to the length of the channel memory (the amount of channel estimator taps is L+1). A signal, which is interfered by one dominating interference signal having a strong signal strength, can be written in the form:

$$(8) \quad y_k = \sum_{n=1}^{2} \sum_{i=0}^{L} h_i^n a_{k-i}^n + n_k,$$

where $a_{k-i}^n$ refers to data symbols of the desired signal and the dominating interference, which data symbols can be bits or bit combinations, and $n_k$ is noise. When the interference signal is weak, as in n=1, only the desired signal is received in practice.

To detect the most interfering interference signal, several known algorithms have been developed. When the most interfering interference signal has been found, a combined channel estimate $\hat{h}_2 = (h_0^1, h_1^1 \ldots h_L^1 \ h_0^2, h_1^2 \ldots h_L^2)^T$ of the desired signal and the interference signal can be formed. Let us now form two signal estimates, which are based on the channel estimate and known sequence of the desired signal and on the channel estimate and known sequence relating to the interference signal, in the following manner:

$$\hat{y}_1 = M_1 \hat{h}_1 \quad (9)$$

$$\hat{y}_2 = M_2 \hat{h}_2, \quad (10)$$

where the matrixes $M_1$ and $M_2$ are co-channel estimation matrixes. Thereafter, residual signals $r_1$ and $r_2$ are formed as follows:

$$r_1 = |y - \hat{y}_1|^2 \quad (11)$$

$$r_2 = |y - \hat{y}_2|^2 \quad (12)$$

where the residual signals $r_1$ and $r_2$ refer to the effective difference between the received signal y and the signal estimate $\hat{y}_1$ or $\hat{y}_2$. Such a difference, for its part, informs us of how close the signal estimate $\hat{y}_1$ or $\hat{y}_2$ is to the actual received signal y. The smaller the difference, or residual signal $r_1$ or $r_2$, is, the better the channel estimate has been. As the signal estimates are based on either the channel estimate of the desired signal only or the estimate that is common to the desired signal and the interference signal, the magnitude of the residual signals informs us of whether subjection to a real co-channel interference occurs or whether the greatest interference is chiefly noise. If interferences are mainly noise, co-channel detection is not worth using.

The magnitude of the residual signals $r_1$ and $r_2$ can be calculated most conveniently by forming the energy of the residual signals in the following manner:

$$(13) \quad P_1 = \sum_{i=1}^{K} r_{1,i}$$

$$(14) \quad P_2 = \sum_{i=1}^{K} r_{2,i},$$

where i is the index and $r_{1,i}$, for example, is the i:th element of the residual signal vector $r_1$. By comparing which is bigger, $P_1$ or $P_2$, conclusions can be drawn and it can be selected, which detection is used: one signal detection or co-channel detection. If $P_1$ is bigger, there is no co-channel interference, not at least considerably, and one signal detection can be used. On the other hand, if $P_2$ is bigger, co-channel interference is considerable and joint detection is worth using. As a detector in the inventive solution, a prior art detector or prior art detectors is/are used, which detector (s) can perform one signal detection or joint detection. An example of such a known detector is a Viterbi detector.

Figure 3:
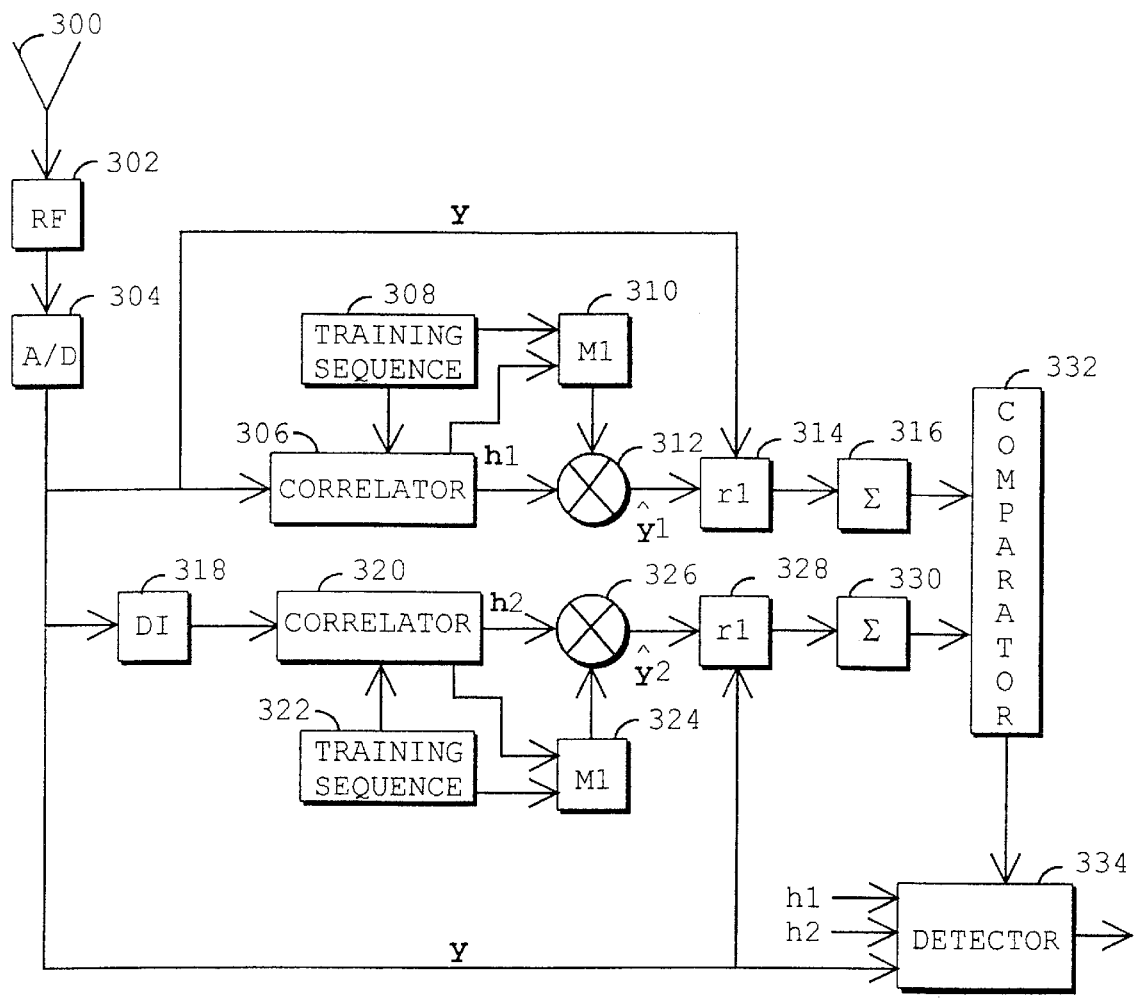
FIG. 3 shows a block diagram of a receiver of the invention.

FIG. 3 shows a block diagram of a receiver implementing the inventive method. An antenna 300 receives a radio frequency signal, which propagates to an RF block 302 to be scrambled from the radio frequency to a lower baseband in a known manner. The baseband signal is converted into digital in an A/D converter 304. In the inventive solution, the digital signal propagates to two different examinations, in which it is found out whether there is co-channel interference in the signal. In block 306, a channel estimate h is formed, for example in a manner known per se by correlating the received signal and the known sequence, which is preferably a training sequence. The known sequence is fed to block 306 from block 308, in whose memory the known sequence is stored. Block 310 forms a co-channel estimation matrix M of the known sequence and the channel estimate $h_1$. In these blocks (the subindex of the parameters is 1), the co-channel estimation matrix $M_1$ comprises only information on the desired signal and noise. The channel estimate $h_1$ is multiplied by the co-channel estimation matrix $M_1$, i.e. a convolution is formed in block 312, whereby an estimate signal $\hat{y}_1$ is formed. In block 314, the received signal y is compared with the estimate signal $\hat{y}_1$. The comparison is made preferably as a square of the difference, whereby a residual signal $r_1$ is formed. In block 316, the energy of the residual signal $r_1$ is formed by calculating the sum of the elements of the residual signal vector, for example.

In the second branch, the digital signal propagates to block 318, where the strongest interference signal is searched in a manner known per se. After the interference signal has been found, a co-channel estimate $h_2$ is formed in block 320 for example in a manner known per se by correlating the received interference signal and the known sequence, which is preferably a training sequence of the interference signal. The known sequence is fed to block 320 from block 322, in whose memory the known sequence is stored. Block 324 forms a co-channel estimation matrix $M_2$ from the known sequence and the co-channel estimate $h_2$. The co-channel estimate $h_2$ is multiplied by the co-channel estimation matrix $M_2$, i.e. a convolution is formed in block 326, whereby an estimate signal $\hat{y}_2$ is formed. In block 328, the received signal y is compared with the estimate signal $\hat{y}_2$. The comparison is preferably made as a square of the difference, whereby a residual signal $r_2$ is formed. In block 330, the energy of the residual signal $r_2$ is formed by calculating the sum of the elements of the residual signal vector, for example. The energies of the residual signals are compared with each other in block 332, and the detector 334 is informed according to the inventive method of whether one signal detection or co-channel detection is used.

Even though the invention has been explained in the above with reference to the example in accordance with the accompanying drawings, it is obvious that the invention is not restricted to it but can be modified in a variety of ways within the scope of the inventive idea disclosed in the attached claims.

What is claimed is:

1. A reception method used in a radio system, in which a receiver receives signals comprising a desired signal and one or more interference signals, which desired signal and interference signals comprise a predetermined sequence, by which the signals can be separated from each other, characterized by forming a signal estimate of the desired signal by means of the predetermined sequence of the desired signal;

searching for the most interfering interference signal and forming a co-channel signal estimate by means of the predetermined sequences of the desired signal and the interference signal;

forming the first residual signal, which describes the difference between the received signal and the signal estimate of the desired signal;

forming the second residual signal, which describes the difference between the received signal and the co-channel signal estimate;

comparing the first residual signal with the second residual signal an don the basis of the comparison, detecting the received signal either by one signal detection, whereby the effect of the interference signal on the desired signal is left unnoticed, or by joint detection, whereby the effect of the interference signal on the detection of the desired signal is taken into account.

2. A method as claimed in claim 1, characterized by forming a channel estimation matrix and channel estimate vector of the desired signal by means of the known sequence;

forming a channel estimate vector of the interference signal by means of the known sequence of the interference signal;

forming a co-channel estimation matrix by means of the known sequences of the desired signal and the interference signal;

forming a signal estimate of the desired signal by means of the channel estimate matrix of the desired signal and the channel estimate vector of the desired signal, whereby it is assumed that the received signal is mainly interfered by noise;

forming a co-channel signal estimate of the received signal by means of the co-channel estimation matrix and the combined channel estimate vector of the desired signal and the interference signal, whereby it is assumed that the received signal is mainly interfered by the interference signal.

3. A method as claimed in claim 1, characterized by forming the first residual signal according to the following formula:

$r_1 = |y - \hat{y}_1|^2$, where $r_1$ is the first residual signal, y is the received signal, $\hat{y}_1$ is the signal estimate of the received desired signal; and forming the second residual signal according to the following formula:

$r_2=|y-\hat{y}_2|^2$, where $r_2$ is the second residual signal, y is the received signal, $\hat{y}_2$ is the co-channel signal estimate of the received desired signal.

4. A method as claimed in claim 3, characterized by, to compare the energies of the residual signals, forming the sum of the elements of the first residual signal with the formula $$P_1 = \sum_{i=1}^{K} r_{1,i}$$

and calculating the sum of the elements of the second residual signal using the formula $$P_2 = \sum_{i=1}^{K} r_{2,i},$$

where $P_1$ is the energy of the first residual signal, $P_2$ the energy of the second residual signal, K is the length of calculation, i is the index of the elements;

comparing the energies $P_1$ and $P_2$ with each other, and if $P_1<P_2$, selecting one signal detection for use, and if $P_1 \geq P_2$, selecting joint detection for use.

5. A method as claimed in claim 1, characterized by searching the most interfering signal which as the greatest power in the reception.

6. A method as claimed in claim 1, characterized by forming the energy of the channel estimate of the interference signal and determining the signal with the greatest energy as the most interfering signal.

7. A method as claimed in claim 1, characterized by searching for the most interfering signal which as the poorest known sequence cross-correlation result with the desired signal.

8. A method as claimed in claim 1, characterized by the radio system being a TDMA radio system.

9. A receiver for a radio system, in which signals to be received comprise a desired signal and one or more at least occasionally occurring interference signals, which desired signal and interference signal comprise a predetermined sequence, by which the signals can be separated from each other, characterized in that the receiver comprises:

means for searching for the most interfering interference signal;

means for forming a signal estimate of the desired signal by means of the predetermined sequence of the desired signal;

means for forming a co-channel signal estimate by means of the predetermined sequences of the desired signal and interference signal;

means for forming the first residual signal, which describes the difference between the received signal and the signal estimate of the desired signal;

means for forming the second residual signal, which describes the difference between the received signal and co-channel signal estimate;

means for comparing the first residual signal with the second residual signal and for selecting a detector on the basis of the comparison either a one signal detection or joint detection to detect the received signal.

10. A receiver as claimed in claim 9, characterized in that the receiver comprises:

means for forming a channel estimation matrix and channel estimate vector of the desired signal by means of the known sequence;

means for forming a co-channel estimation matrix of the interference signal by means of the known sequences of the interference signal and the desired signal, and forming a channel estimate vector of the interference signal by means of the known sequence of the interference signal;

means for forming a signal estimate of the received signal by means of the channel estimation matrix in the memory and the channel estimate vector of the desired signal, whereby it is assumed that the received signal is mainly interfered by noise;

means for forming a co-channel signal estimate of the received signal by means of the co-channel estimation matrix in the memory and the combined channel estimate vector of the desired signal and interference signal, whereby it is assumed that the received signal is mainly interfered by the interference signal.

11. A receiver as claimed in claim 10, characterized in that the means are adapted to form the first residual signal according to the following formula:

$r_1=|y-\hat{y}_1|^2$, where $r_1$ is the first residual signal, y is the received signal, $\hat{y}_1$ is the estimate of the received desired signal; and the means are adapted to form the second residual signal according to the following formula:

$r_2=|y-\hat{y}_2|^2$, where $r_2$ is the second residual signal, y is the received signal, $\hat{y}_2$ is the co-channel signal estimate of the received signal.

12. A receiver as claimed in claim 9, characterized in that, to compare the energies of the residual signals, the receiver comprises means for forming the sum of the elements of the first residual signal with the formula $$P_1 = \sum_{i=1}^{K} r_{1,i}$$

and the receiver comprises means for forming the sum of the elements of the second residual signal with the formula $$P_2 = \sum_{i=1}^{K} r_{2,i},$$

where $P_1$ is the energy of the first residual signal, $P_2$ is the energy of the second residual signal, K is the length of calculation, i is the index of the elements;

the means are adapted to compare the energies $P_1$ and $P_2$ with each other, and if $P_1<P_2$, the detector is adapted to use one signal detection, or if $P_1 \geq P_2$, the detector is adapted to use joint detection.

13. A receiver as claimed in claim 9, characterized in that the searching means are adapted to search for the most interfering signal which has the greatest power in the reception.

14. A receiver as claimed in claim 9, characterized in that the searching means for searching the most interfering signal are adapted to form the energy of the channel estimate of the interference signal and that the means are adapted to determine the signal having the greatest energy as the most interfering signal.

15. A receiver as claimed in claim 9, characterized in that the searching means are adapted to search for the most interfering signal which has the poorest known sequence cross-correlation result with the desired signal.

16. A receiver as claimed in claim 9, characterized in that the receiver is adapted to operate in a TDMA radio system.

* * * * *